(12) United States Patent
Lagergren-Julander

(10) Patent No.: US 6,715,177 B1
(45) Date of Patent: Apr. 6, 2004

(54) PORTABLE RAMP

(76) Inventor: Anita Lagergren-Julander, Grindstugan, Skogsberga, Täby (SE), 187 75

( * ) Notice: Subject to any disclaimer, the term of this patent is extended or adjusted under 35 U.S.C. 154(b) by 0 days.

(21) Appl. No.: 09/646,895

(22) PCT Filed: Apr. 14, 1999

(86) PCT No.: PCT/SE99/00594

§ 371 (c)(1),
(2), (4) Date: Oct. 10, 2000

(87) PCT Pub. No.: WO99/54242

PCT Pub. Date: Oct. 28, 1999

(30) Foreign Application Priority Data

Apr. 17, 1998 (SE) .............................................. 9801339

(51) Int. Cl.⁷ ........................... E01D 18/00; B65G 69/28
(52) U.S. Cl. ......................... 14/69.5; 119/847; 119/849
(58) Field of Search ........................... 182/94, 97, 206; 14/69.5; 119/847, 849

(56) References Cited

U.S. PATENT DOCUMENTS

| | | | |
|---|---|---|---|
| 3,173,398 A | | 3/1965 | Raymond ........................ 119/1 |
| 3,891,053 A | | 6/1975 | Burton ........................... 182/97 |
| 4,294,571 A | * | 10/1981 | Tordella ........................ 414/537 |
| 4,356,593 A | * | 11/1982 | Heininger et al. .............. 16/251 |
| 4,523,745 A | * | 6/1985 | Killman et al. |
| 4,528,711 A | * | 7/1985 | Packer ........................ 14/69.5 |
| 4,570,291 A | * | 2/1986 | Smith et al. ................... 16/250 |
| 4,570,297 A | * | 2/1986 | Nijhuis ......................... 452/97 |
| 4,710,049 A | * | 12/1987 | Chang .......................... 403/23 |
| 4,726,516 A | * | 2/1988 | Cree .......................... 238/10 R |
| 4,779,298 A | * | 10/1988 | Nichols, Sr. et al. ......... 14/69.5 |
| 5,287,580 A | * | 2/1994 | Nelson ......................... 14/71.3 |
| 5,440,773 A | * | 8/1995 | Lentini ........................ 14/69.5 |
| 5,517,708 A | * | 5/1996 | Baranowski ................. 14/69.5 |
| 5,752,800 A | * | 5/1998 | Brincks et al. ............. 414/537 |
| D412,224 S | * | 7/1999 | Adler ......................... D30/119 |
| D420,175 S | * | 2/2000 | Garrels, Jr. ................ D30/119 |

FOREIGN PATENT DOCUMENTS

| | | |
|---|---|---|
| DE | 1 630 142 | 6/1971 |
| EP | 0 664 266 | 7/1995 |
| GB | 2 213 463 | 8/1989 |

* cited by examiner

Primary Examiner—Thomas B. Will
Assistant Examiner—Raymond W. Addie
(74) Attorney, Agent, or Firm—Jacobson Holman PLLC

(57) ABSTRACT

A ramp, for instance a walk ramp for pets, such as dogs, includes an elongated walk bridge (1) which is intended to be placed so as to slope between two height levels. The bridge includes two parts (10, 11) which are mutually sequential in the longitudinal direction of the bridge and which are mutually connected via a hinge means (18) which in one swinging direction has an end position in which the walk surfaces of said parts (10, 11) are essentially parallel and in a common plane, and which in its other swinging direction enable the parts (10, 11) to be folded to essential parallelity. When the bridge is extended or unfolded, a join gap between the parts (10, 11) on the upper load-carrying side of the bridge will be covered by a cover plate (4), which has an edge part that is fastened to one bridge part (10) and extends generally transversely over the width of the bridge (1). The opposite edge part of the cover plate (4) is free in the folded state of the bridge and projects out beyond the ends of said bridge parts (10, 11). The free edge part of the cover plate has an opening (41) which, when the bridge is extended or unfolded, is spaced from the join (17, 17) between parts such as to form a bridge carrying handle (42).

11 Claims, 2 Drawing Sheets

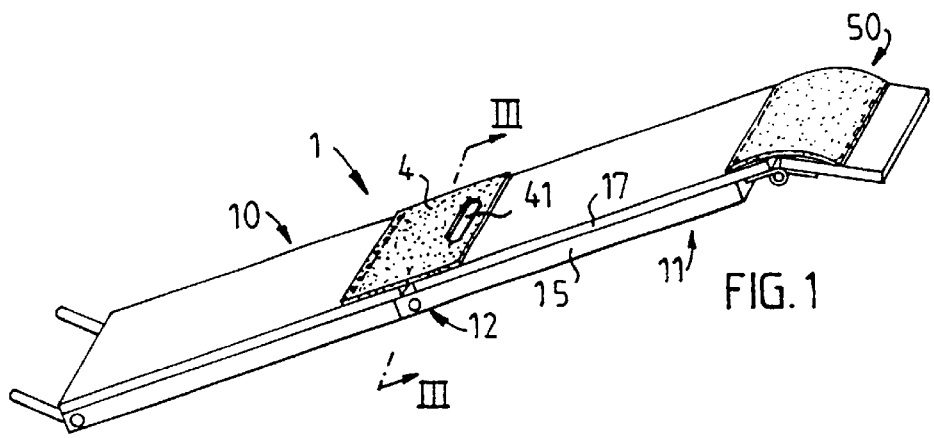
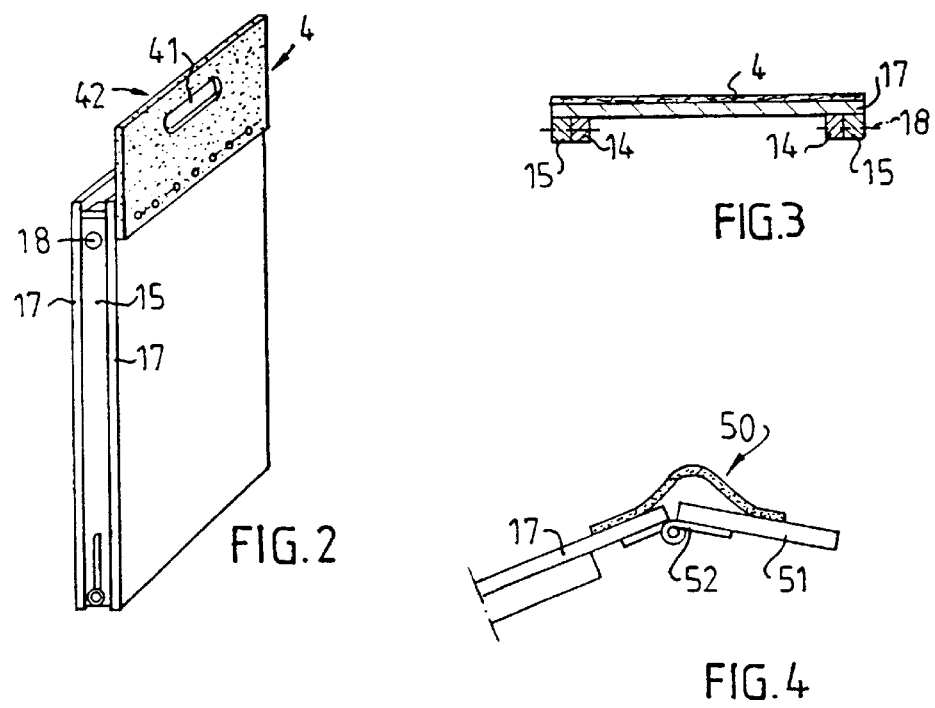

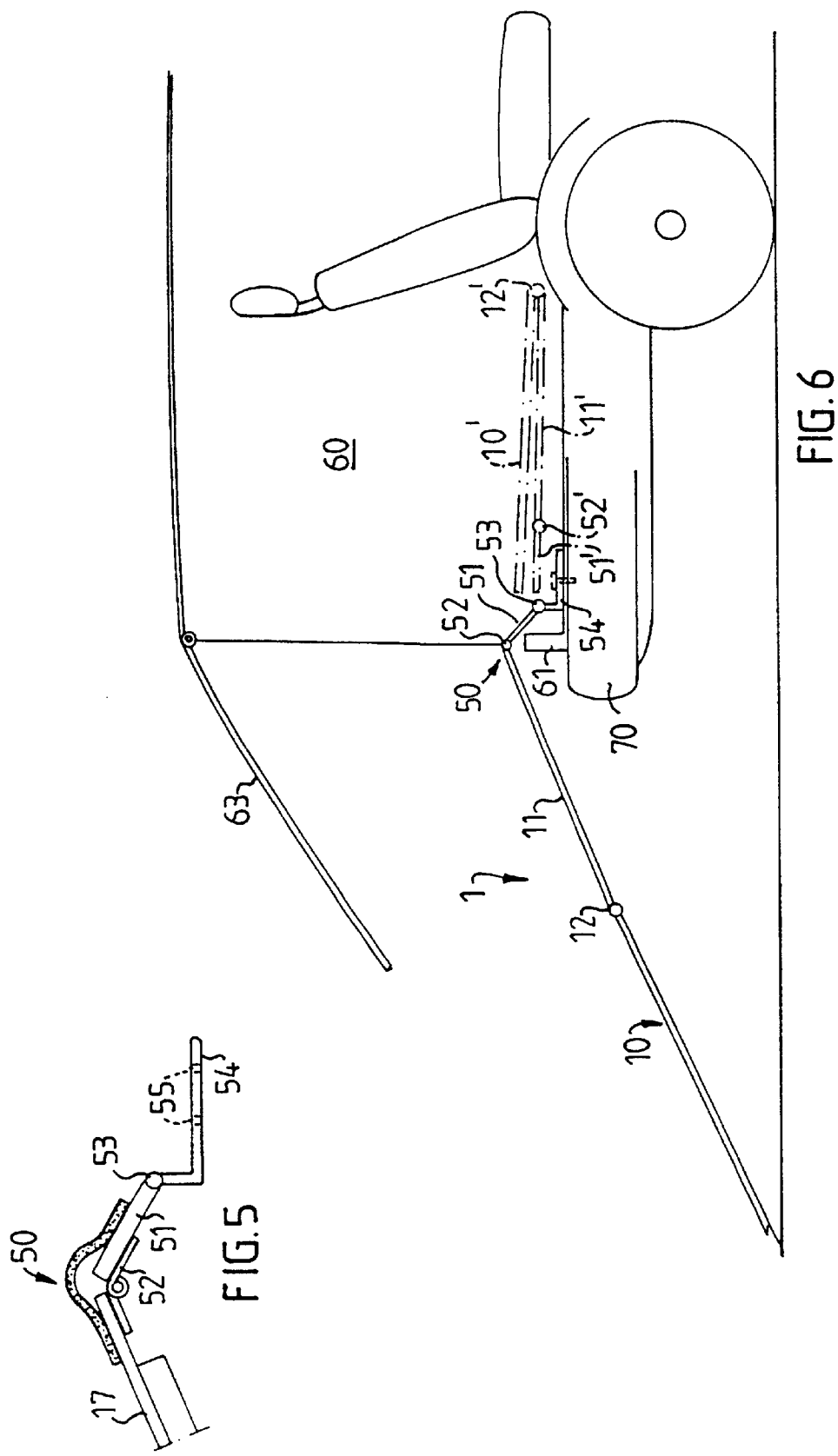

PORTABLE RAMP

BACKGROUND OF THE INVENTION

1. Field of the Invention

The present invention relates to a portable ramp in the form of an elongated walk bridge that is intended to slope between two height levels and that includes two parts which are mutually sequential in the longitudinal direction of the bridge and which are mutually connected through the medium of a hinge member.

The hinge has, in one pivotal direction, an end position in which walk surfaces of the parts are essentially aligned and in a common plane. In another pivotal direction, the hinge enables the parts to be folded essentially in parallel to each other. In the extended or unfolded state of the bridge, a cover plate covers a joint gap between the parts on the upwardly facing, load-carrying side of the bridge. The cover plate has an edge part which is fastened to one bridge part and which extends generally transversely across the width of the bridge.

2. Prior Art

It is well known that pets, such as dogs, sometimes find it difficult to jump from the ground up into the boot or baggage space of an automobile, for instance. This may be due to illness, age, or for some other reason. It is known to use a walk ramp if the pet/dog is heavy and it is desired to transport the dog by car, for instance. In so doing, one end of the ramp is placed on the ground and its other end is placed on the edge of an open car boot or baggage space. When the ramp has a suitable length/slope, the dog itself is able to walk up and down the ramp, possibly with some assistance. In practice, the ramp/bridge will preferably have a length of about 2 m. For ease of transport in the car, the ramp will preferably be hinged about a longitudinal centre region, said hinge means including means for stopping unfolding of the ramp when it has reached its use position, i.e. when the walk surfaces of the bridge parts are parallel.

However, known ramps/bridges of this nature are still encumbered with certain problems. One problem is that the ramp is relatively heavy and difficult to handle, for example with respect to lifting the ramp into and out of the car and also with respect to folding-up and unfolding the ramp. Another problem is that a foldable ramp construction constitutes a risk of a dog's claw fastening in the joint region between the outwardly folded parts of the ramp. The consequences of such an occurrence are serious and the problem cannot therefore be ignored.

SUMMARY OF THE INVENTION

An object of the present invention is to provide a ramp which offers a favourable solution to the aforesaid problems and which can be used with particular benefit as an animal walk ramp or overpass, for instance for dogs. The inventive ramp can, however, be used from a general aspect.

This object is achieved with a ramp that includes an elongated walk bridge for sloping between two height levels and includes two parts which are mutually sequential in a longitudinal direction of the bridge. The two parts are mutually connected through a hinge member which in one pivotal direction has an end position in which walk surfaces of the parts are essentially in line and in a common plane, and which in another pivotal direction enables the parts to be folded essentially in parallel to each other. In the extended or unfloded state of the bridge, a cover plate covers a joint gap between the parts on the upwardly facing, load-carrying side of the bridge. The cover plate has an edge part which is fastened to one bridge part and extends generally transversely accross the width of the bridge.

Further embodiments of the inventive ramp reside in the higher end of the bridge including means for securing the bridge to a threshold member at the higher level. The securing means includes a flap which defines a downwardly facing recess with the bridge. The flap is pivotally connected to the bridge by a second hinge member which enables the flap to be dropped in a use position of the bridge.

The ramp includes a flexible covering fabric which covers a joint between the flap and the bridge in the use position. A friction enhancing means, such as anti-slip means, on the end-parts of the bridge, wherein the end of the bridge is intended to lie on a higher level, is connected to an anchoring attachment through a pivot link device which connects the bridge and the anchoring attachment. Further, the bridge can be folded into a baggage space and stored in a folded state on th floor of the baggage space.

Basically, the joint between the unfolded or extended bridge parts is bridged by a tongue which extends over the width of the ramp and which is attached to one bridge part. The tongue is designed to lie in abutment with the other bridge part when the ramp is unfolded into its state of use. The tongue is preferably attached to that part of the ramp which is located lowermost in the sloping ramp when in use. When the ramp is folded up, so that the bridge parts are again generally parallel with each other, the tongue protrudes out beyond the end of the folded ramp. The tongue includes a through-penetrating opening. This opening defines together with the free edge-part of the tongue a handle which facilitates transportation/handling of the ramp and also facilitates handling of the ramp in conjunction with unfolding/folding of the ramp.

The bridging tongue may be comprised of elastomeric material, but may even consist of a generally rigid, thin plate.

The hazardous joint gap between the bridge parts is covered by the tongue. The opening of the tongue is located on one side of this gap in the use position of the ramp.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE DRAWINGS

The invention will now be described in more detail by way of example, with reference to the accompanying drawings.

FIG. 1 is a schematic, perspective view of an unfolded or extended walk ramp in connection with the present invention.

FIG. 2 shows the ramp of FIG. 1 in a folded or collapsed state.

FIG. 3 is a schematic sectional view taken on the line III—III in FIG. 1.

FIG. 4 is a schematic side view of the upper end-part of the ramp of FIG. 1.

FIG. 5 shows a further development of the construction shown in FIG. 4.

FIG. 6 shows the walk ramp of FIG. 5 fitted to a car.

DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The ramp of the present invention comprises a bridge or overpass 1 that includes two parts 10, 11 which are interconnected by a hinge means 12. Each bridge part 10, 11 is comprised of two mutually parallel support bars 14 and 15, each supporting a respective plywood sheet 17. The sheet 17 is covered with matting (not shown) which functions to prevent the dog from slipping. The hinge means 12 is comprised of coaxial pivot shafts 18 which are positioned so as to enable the parts 10, 11 to be folded from an end position in which they lie in a common plane and in which the sheets 17 are in butt contact with each other, through 180° to a folded or collapsed position in which the bridge parts 10, 11 are essentially plane parallel with each other (FIG. 2).

One bridge part 10 carries a covering tongue 4, comprised for instance of an elastic, rubber plate. The tongue 4 extends over the width of the bridge 1 and is fastened to the lower bridge part 10 along one edge of the tongue. In the unfolded or extended state of the ramp, the tongue 4 lies flat against the upper surface of the upper bridge part 11 and includes an opening 41 which is spaced from the joint between the sheets 17 in the unfolded or extended state of the ramp. The opening 41 defines a handle which projects out from one end of the folded ramp.

The upper end of the ramp includes means for securing the upper part of the ramp to a threshold member of the baggage space or boot of the car or to some like structural member. The securing means 50 may comprise a flap 51 which is connected to the covering sheet 17 of the upper bridge part 11 by a hinge means 52. The flap 51 and the sheet 17 may be adapted to lie in butt contact when the flap and the sheet 17 of the bridge part 11 form a downwardly turned concavity which recieves a boot threshold or some like structural member. As illustrated, the upper side of the sheet joint in the vicinity of the hinge means 52 may be covered with a curved, flexible material, for instance matting, so as to prevent a dog's claws from fastening in the joint.

The free end of the bars belonging to the lower bridge part 10 may be provided with friction enhancing means that function to counteract slipping of the bridge part on an underlying supportive surface. The lower bridge part 10 may also have provided on its end a bridging flap which corresponds to the flap 51 but fixedly angled in the other direction.

FIG. 5 shows the flap 51 connected by hinge means 53 to a fitting 54 that includes holes 55 for receiving screws, rivets or the like.

FIG. 6 illustrates a car that includes a baggage space 60 which is delimited rearwardly by a threshold member 61. The illustrated car includes a tailgate 63 pivotally mounted at its upper edge. The fitting 54 is attached to the rear part of the floor of the baggage space. The flap/hinge means 51 and its pivotal connection 52, 53 to the ramp 1 and to the fitting 54 respectively enables the threshold member 61 to be comfortably bridged and also enables the pivot means 52 to be displaced rearwardly to an extent at which the ramp proper will pass free from the rear bumper or fender and the like extending rearwardly beyond the rear limitation of the baggage space.

The lengths of the bridge parts 10, 11 and the flap/link 51 are adapted so that they can be folded into and out of the baggage space, as indicated in FIG. 6. The ramp is folded up or collapsed, by first folding in the flap 51 around the hinge means 53 and then folding together the bridge parts 10, 11 by lifting the ramp by the handle 42 and swinging-in the collapsed ramp in the baggage space around the hinge means 52, to the folded position shown in broken lines, in which position the main parts of the ramp 1 are indicated through the medium of their reference signs to which a prime has been added.

The embodiment shown in FIGS. 5 and 6 thus enables any threshold member 61 to be bridged comfortably and also enables the pivot means 52 to be displaced longitudinally so as to allow the ramp to be readily extended into the baggage space and extended to an operative state without hindrance from the rear bumper and the like rearwards of the baggage space opening.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A foldable and portable ramp comprising:

a first bridge part and a second bridge part mutually connected by a hinge member coupled to an underside of said first and second bridge parts, said ramp having an extended position in which said first and second bridge parts are in sequential alignment in a common plane, and a folded position in which said first and second bridge parts are pivoted on said hinge to be in planes generally parallel with one another, upper surfaces of said first and second bridge parts providing a walk surface divided by a joint when said ramp is in said extended position;

an elastic covering tongue fastened at one end to the upper surface of one of said first and second bridge parts adjacent the joint, said fastened end extending transversely across a width of the walk surface, a free end of said covering tongue extending over the joint and transversely across the width of the walk surface such that said covering tongue lies flat on said walk surface and covers said joint when said ramp is in said extended position;

a flap pivotally connected to one end of said ramp intended to lie on a higher height level by a second hinge member which allows the flap to be tilted down when the ramp is in the extended position, said flap when tilted down defining a downwardly facing recess with said ramp for securing the ramp over a raised threshold area at said higher height;

a flexible fabric piece fastened to said one end and to said flay on upper surfaces thereof for covering a second joint between the flap and the ramp; and said elastic covering tongue having an opening in said free end which, when the ramp is in said extended position, is spaced from the walk surface joint, said opening defining an elastic handle which projects outwardly when said ramp is in said folded position.

2. The ramp as set forth in claim 1, further comprising an anchoring attachment pivotally connected to said flap for connecting the ramp to the threshold area.

3. The ramp as set forth in claim 2, wherein said anchoring attachment includes an L-shaped member with one arm connected to said flap with a hinge, and the other arm having a fitting for fixed attachment to a mounting surface in the threshold area.

4. The ramp as set forth in claim 1, further comprising friction enhancing elements positioned on the walk surface.

5. A foldable and portable ramp comprising:

a first bridge part and a second bridge part mutually connected by a hinge member coupled to an underside of said first and second bridge parts, said ramp having an extended position in which said first and second bridge parts are in sequential alignment in a common plane, and a folded position in which said first and second bridge parts are pivoted on said hinge to be in planes generally parallel with one another, upper surfaces of said first and second bridge parts providing a walk surface divided by a joint when said ramp is in said extended position;

a covering tongue fastened at one end to the upper surface of one of said first and second bridge parts adjacent the joint, said fastened end extending transversely across a width of the walk surface, a free end of said covering tongue extending over the joint and transversely across the width of the walk surface such that said covering tongue lies flat on said walk surface and covers said joint when said ramp is in said extended position, said free end defining a handle which projects outwardly when said ramp is in said folded position;

a flap pivotally connected to one end of said ramp intended to lie on a higher height level, said flap tilted down when the ramp is in the extended position to define a downwardly facing recess with said ramp for securing the ramp over a raised threshold area at said higher height; and a flexible fabric piece fastened to said one end and to said flap on upper surfaces thereof for covering a second joint between the flap and the ramp.

6. The ramp as set forth in claim 5, further comprising an anchoring attachment pivotally connected to said flap for connecting the ramp to the threshold area.

7. The ramp as set forth in claim 6, wherein said anchoring attachment includes an L-shaped member with one arm connected to said flap with a hinge, and the other arm having a fitting for fixed attachment to a mounting surface in the threshold area.

8. The ramp as set forth in claim 5, further comprising friction enhancing elements positioned on the walk surface.

9. The ramp as set forth in claim 5, wherein the covering tongue is made of an elastic material.

10. The ramp as set forth in claim 5, wherein said handle defined by said free end includes an opening which, when the ramp is in said extended position, is spaced from the walk surface joint.

11. The ramp as set forth in claim 5, wherein the flap is connected to the ramp by a hinge mounted to lower surfaces thereof.

* * * * *